INVENTORS
MATTHEW T. THORSSON
LOUIS J. LAULER
BY
ATTORNEY

United States Patent Office 2,882,035
Patented Apr. 14, 1959

2,882,035

WEIGHING SCALE SYSTEM WITH WEIGHT RECORDER

Louis J. Lauler and Matthew T. Thorsson, Rock Island, Ill., assignors to Fairbanks, Morse & Co., Chicago, Ill., a corporation of Illinois Application February 21, 1952, Serial No. 274,166

9 Claims. (Cl. 265—5)

This invention relates to weighing scales, and more particularly to a weighing scale organization embodying an electrical system for sensing scale loading and effecting weight indication and recording of scale loads. The instant application is a continuation-in-part of our copending application entitled "Weighing Scale System," filed November 30, 1951 and bearing Serial No. 259,148, now Patent No. 2,766,981.

In general, the weighing scale organization of the present invention includes load support means which for example, may be a scale platform and lever system of any well known type, and strain gage load cell means coupled to the load support means for sensing the loading of the support. The load cell means herein employed is of known construction, providing an electrical network normally balanced under zero strain condition of the cell means, and producing an output voltage the magnitude and phase direction of which are directly dependent upon the extent and direction of unbalance of the network as determined in the load sensing function of the cell means, by the application of load to and load removal from the scale load support means. The load cell means which in load sensing unbalance of its network produces an output voltage proportional to the weight of the scale loading, is included in the electrical system of the present invention, to function as the activating agency in such system. The electrical system referred to, embodies in addition to the cell means, a tare bridge network, a regulated balance bridge network including a balancing potentiometer, phase sensitive amplifier, a reversible motor in operative connection to the balancing potentiometer and to weight indicator and recorder means, and control provisions effective for preventing weight-recording operation of the recorder means until the electrical system attains a stable balanced condition in its scale load sensing function.

In the scale organization generally outlined above, the cell means normally is subjected to an initial strain due to the tare or "dead" weight of the load support means, which results in a cell network output voltage proportional thereto. Such cell voltage alone or as increased in magnitude due to load tare weight imposed on the load support, is nullified through the tare bridge network which is made adjustable for that purpose, so that this initial cell voltage will not interfere with the normal weight sensing and indicating function of the system in respect to all loads to be measured. Once the tare bridge adjustment is made, application of load to the support means will unbalance the cell network to activate the electrical system, the net cell output voltage (in the range above the initial cell voltage cancelled out by the tare bridge network) then being applied to the balance bridge network and causing through the amplifier means, operation of the motor in the proper direction such that it actuates the balancing potentiometer in the direction to produce an opposing voltage in the balance bridge network and balance out the net cell output voltage, whereupon the motor stops. Any decrease in the load under measurement or its removal from the support, will effect corresponding decrease in the net cell output voltage with resultant unbalance of voltages in the balance bridge network in the opposite direction, and consequent reverse operation of the motor to actuate the potentiometer in the opposite direction until the balance bridge once again provides an opposing voltage equal to the new net cell output voltage. In all cases the extent of motor operation in either direction, is a definite function of the magnitude of the net cell output voltage, while the net cell voltage is directly proportional to the weight of the load to be measured. Therefore, the extent of motor operation is proportional to the weight of the load to be measured, so that in the present system the motor affords a ready instrumentality for operating suitable weight indicator means and for properly conditioning recorder means to provide weight recording or printing of scale load weights.

Moreover, through regulation of the balancing characteristics of the balance bridge network, the extent of motor operation may be related to the weight of the scale load to be measured, by a definite ratio predetermined such that the motor in operating through reduction gear means selected in accordance with said ratio, will operate the indicator means to provide weight reading of the scale load weight in terms of units of a given weight measuring system, as pounds for example, and concurrently therewith condition the recorder means for recording or printing the scale load weight in terms of the same units. Although not shown herein, the present system may be readily adapted for indicating and recording scale load weights selectively in terms of units of any one of several different measuring systems, as by utilizing for such purpose the novel control provisions disclosed in the aforesaid Patent No. 2,766,981.

The electrical system embodies in addition, an energization control provision for the reversible motor, which is operable selectively to condition the motor for operation in response to load cell sensing of scale loads, or to prevent motor operation. By this provision the motor when operated to set-up a weight indication on the indicator means, and to condition the recorder for weight printing, may be held in its operative position irrespective of a given weight, holding of the weight indication while another similar weight is applied to the weighing mechanism, and thence reconditioning the motor for operation to indicate the new weight without requiring return of the motor to its initial position representative of zero scale load, whereby to reduce the time element in weight indications where a group of nearly similar weights are to be measured.

An important feature of the present invention resides in the control provision hereinbefore mentioned, which is adapted for sensing balanced and unbalanced conditions of the electrical system, and for preventing weight recording or printing operation of the recorder means until the electrical system is exactly in balance. The control is embodied in phase-sensitive electronic relay network means of a character and function which will appear hereinafter, and is provided for the purpose above indicated and as a means for preventing both inaccuracy in weight printing or recording, and damage to the recorder and other elements of the scale system.

The foregoing and other features of the present invention, together with the several objects and advantages thereof, will appear more fully upon consideration of the following description of the invention as shown by the accompanying drawings, wherein.

Figure 1:
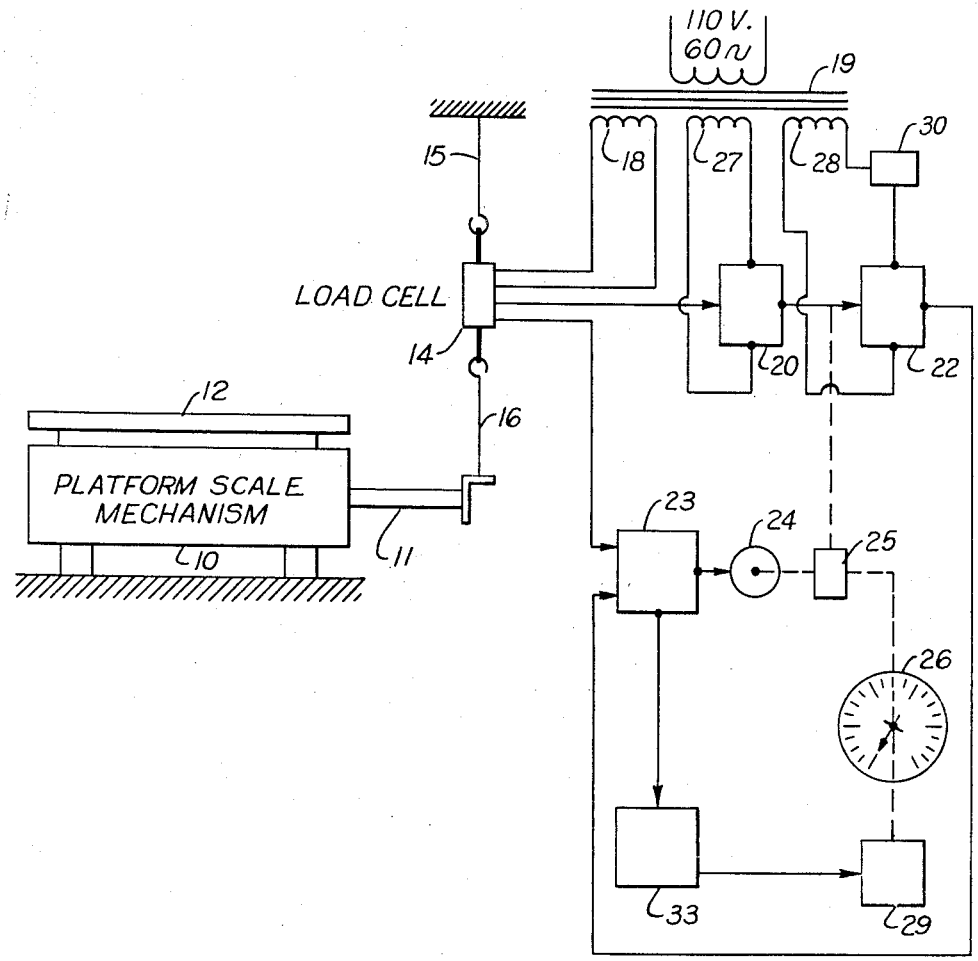
Fig. 1 illustrates diagrammatically, a platform scale mechanism and electrical apparatus in operative association therewith for sensing scale loading, producing weight indications of scale loads and conditioning weight recording means for producing printed or recordings of scale load weights.

Referring to the drawings and first to Fig. 1 thereof, the electrical system for sensing and producing weight indications of scale loads, is shown by way of example, in operative association with a load support or platform scale mechanism generally indicated at 10. Such mechanism may be of usual or well known platform and lever construction providing an output lever 11 movable in response to loading and unloading of the scale platform 12. In place of the usual mechanical balance beam provision operated from the output lever 11 as through a steelyard connection, is a single strain gauge load cell device 14. The load cell 14 is of known construction, and is supported from a fixed support 15 and coupled to the scale output lever 11 as at 16, so that its strain responsive element is thereby directly subject to displacement of the lever 11 consequent to loading and unloading of the scale platform 12. As is known, the load cell 14 embodies an electrical network having an input circuit supplied from a constant voltage source such as the secondary winding 18 of an alternating current supply transformer 19, and an output circuit providing an output potential the magnitude and phase direction of which are dependent upon the extent and direction of unbalance of the cell network consequent to cell reaction to the loading and unloading of the scale mechanism. Although an alternating current source of input to the cell network is here shown in the preferred example of the invention, where it is desired a suitable source of direct current voltage may be employed to supply the cell network input.

The cell output voltage is transferred through the output side of a tare bridge network 20, the output side of a balance bridge network 22, and a suitable phase sensitive electronic amplifier 23, to the control field portion (see Fig. 2) of a reversible motor 24. Motor 24 serves through suitable reduction gearing 25, to operate a network rebalancing device embodied in the balance bridge 22, a weight indicator device such as a dial indicator 26, and in conjunction with operation of the indicator 26, to condition printer mechanism 29 for weight recording or printing as will appear hereinafter. The device 33 represents the scale balance sensing control provision of the present invention, affecting the printer 29 as will be described presently. The input circuit of tare bridge 20 is supplied from a fixed source, as the transformer secondary winding 27, while the input of balance bridge 22 is supplied from secondary winding 28 of transformer 19 through an electrical control 30 of a nature and serving a purpose to appear. The weight sensing and weight indicating and recording function of the electrical system, together with the purpose and function of the tare and balance bridge networks, the bridge control 30 and balance control 33 for printer 29, will appear from the following description of the electrical circuit portion of the system shown in greater detail by Figure 2.

Figure 2:
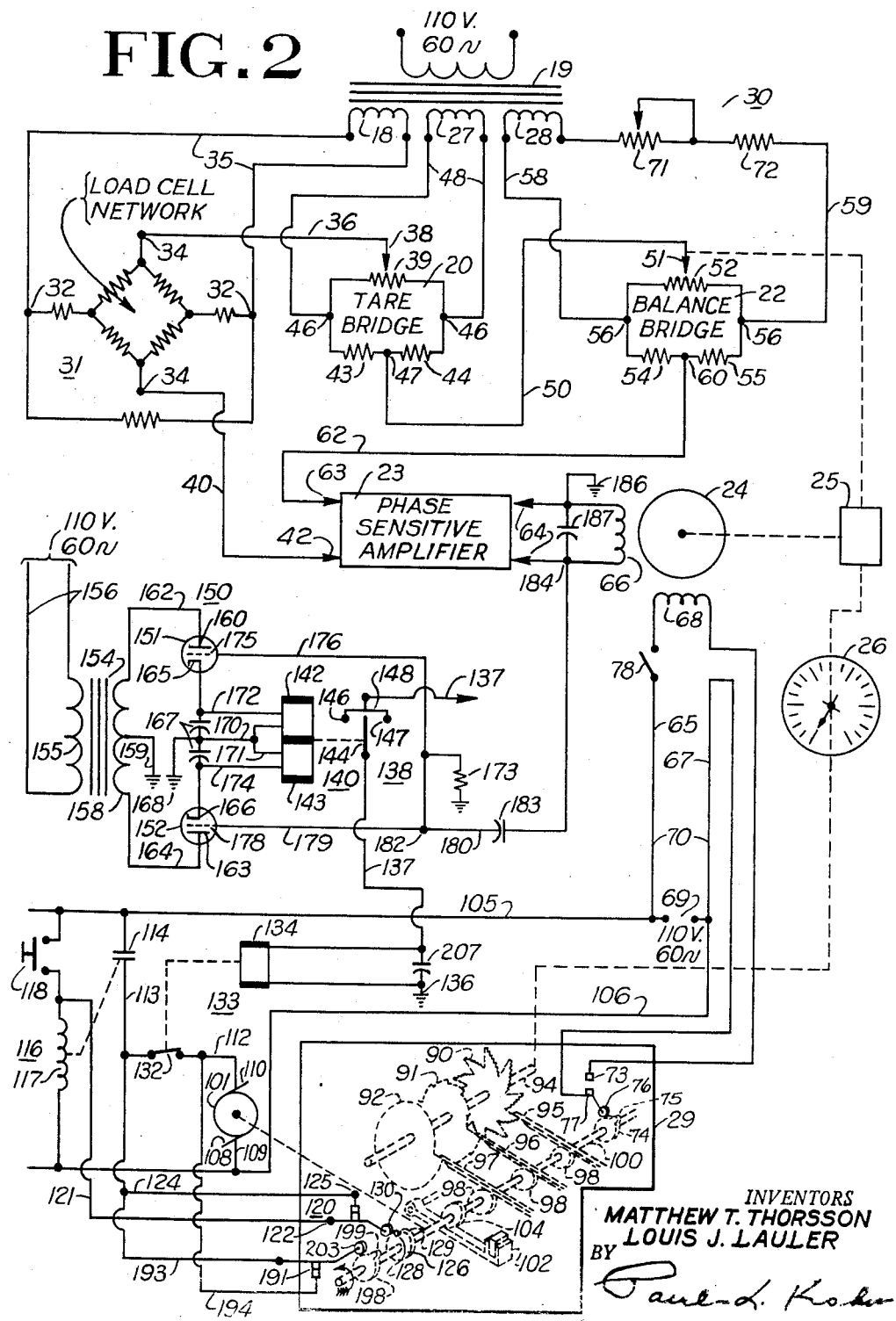
Fig. 2 is a diagram of the electrical circuit arrangement for the electrical apparatus and weight printer as diagrammatically shown in Fig. 1.

Referring to Fig. 2, the electrical network of the strain gauge load cell 14 is shown in the form of a Wheatstone bridge generally indicated by the numeral 31, having input terminals 32 and output terminals 34. The bridge input terminals 32 are connected through an input circuit 35 to the voltage source provided by the secondary winding 18 of the supply transformer 19, supplying a predetermined fixed voltage at the network input terminals. It may be noted here that the load cell 14 is selected such that its load responsive capacity corresponds to the load capacity of the associated platform scale mechanism 10 illustrated in Fig. 1.

One output terminal 34 of the cell network is connected by a lead 36 to the movable element 38 of a variable resistance device or potentiometer 39 providing two legs of the tare bridge network 20, while the opposite output terminal 34 of the cell network is connected by lead 40 to one input terminal 42 of a suitable phase sensitive electronic amplifier 23.

The remaining or complementary legs of the tare bridge 20 are provided by fixed resistance elements 43 and 44, the bridge providing input terminals 46, a fixed output terminal 47 and opposite output terminal which is here constituted by the movable element 38 of the bridge potentiometer 39. The input terminals are connected through a circuit 48 with a bridge input source provided by the transformer secondary winding 27 affording a predetermined constant voltage presently to be referred to. A circuit lead 50 connects the fixed output terminal 47 of the tare bridge to the movable element 51 of a potentiometer 52. The potentiometer 52 provides two legs of balance bridge network 22, the opposite two legs of which are found in fixed resistance elements 54 and 55. The bridge input terminals 56 are supplied through conductors 58 and 59, with an input voltage derived from the transformer secondary winding 28. It is to be noted that the conductor 59 includes resistance means forming the control 30 as indicated in Fig. 1, the nature and function of which will be more fully described hereinafter. The fixed output terminal 60 of the balance bridge is connected by circuit lead 62 with the remaining input terminal 63 of the amplifier 23. The output of the amplifier is connected by the circuit 64 to the control field winding 66 of the reversible motor 24. The motor 24 which may be of a well-known two-phase type, includes a main field winding 68 energized from a suitable fixed voltage source, as the 110 volt, 60 cycle source 69 to which the winding is connected by the circuit 70 through normally closed manual switch 78 and a cam-controlled switch to be described presently. Motor 24 serves through reduction gear mechanism diagrammatically indicated at 25, to operate the movable element 51 of the balance bridge potentiometer 52, and at the same time to operate a weight indicator 26 which is here shown by way of example only, to be of a dial type, and to condition the printer mechanism 29 for weight printing. The latter function will appear more fully hereinafter.

As is known in connection with strain gauge cells of the character now indicated, the cell network output is at zero voltage under the condition of zero strain of the cell. In the present application of the load cell to a load support such as the indicated platform mechanism (Fig. 1), the cell is under an initial strain due to the tare or "dead" weight of the scale platform and associated lever mechanism including the output lever 11. In a system of the character under consideration, it is desirable to eliminate such initial output voltage from any effect upon the electrical system in its load weight indicating function. This may be done by balancing out such voltage through the tare bridge network 20. To that end, the balancing characteristics of the tare bridge and the bridge input voltage from the transformer secondary winding 27 are predetermined with respect to the initial cell output voltage, or such voltage as it may be increased by tare weights imposed on the scale platform, so that upon adjustment of the tare bridge potentiometer 39, the initial voltage will be effectively cancelled. Consequently, the cell voltage effective in the system beyond the tare bridge, will be that portion of the cell output voltage which is directly representative of the loads to be measured.

In the absence of a load to be measured on the scale platform 12, the net output voltage of the load cell will be zero since the initial cell voltage due to the tare or "dead" weight of the scale mechanism and any load tare weight on the platform, is cancelled out through the tare bridge 20. Under this condition, the motor 24 is set to position the movable element 51 of the balance bridge potentiometer 52 such that the bridge is in balance with zero voltage across its output terminals 51 and 60, and hence zero voltage at the input terminals 42 and 63 of the amplifier 23. Now upon application of a load to be measured by the scale mechanism, the load cell network will develop a net voltage in one phase direction and of a magnitude which is proportional to the weight of the imposed load. This voltage, hereinafter referred to as the net cell output voltage, is transmitted through the tare bridge 20 and the balance bridge 22, to provide a resultant voltage at the amplifier input terminals 42 and 63, which voltage then is amplified and reflected in the amplifier output circuit 64 as a control voltage. Such control voltage which is hereinafter referred to as the unbalance voltage of the scale system, is applied by the circuit 64 to the motor control winding 66, to cause motor operation (assuming the motor main winding 68 to be energized) in one direction such as to move the element 51 of the potentiometer 52 in the direction to effect an unbalance of the balance bridge 22. When bridge 22 provides an opposing voltage equal to the net cell output voltage, the motor 24 stops because of the absence of a resultant input voltage to the amplifier at such time, with consequent zero voltage at the motor control field 66. When the load on the scale platform is removed in part or entirely, the net cell output voltage is reduced proportionately. The opposing voltage provided by balance bridge 22 and the net cell output voltage becomes unbalanced but in the opposite direction, so that motor 24 in response to the changed unbalance voltage, operates the movable element 51 of the balance potentiometer 52 in the opposite direction to decrease the opposing voltage provided by bridge 22 until the opposing voltage and net cell output voltage are balanced, at which time the motor again stops.

An important feature of the present system resides in the control instrumentality 30 associated with the balance bridge 22. It will be appreciated that by properly adjusting the balancing characteristics and range of the balance bridge 22, the entire range of the rebalancing potentiometer 52 may be made effective such as to encompass the whole load range capacity of the platform scale mechanism with which the present electrical system is utilized. Further, in controlling the characteristics of the balance bridge 22, the present system may be adjusted or calibrated for providing indications of the weight of the loads to be measured in terms of units of any given measuring system, as the pound units of the avoirdupois system. To this end, the control 30 provides a resistance circuit comprising a control potentiometer 71 in series in the conductor line 59 with a fixed resistance 72. By utilizing a resistance 72 having a predetermined resistance value, and adjusting the total resistance of the resistance circuit through adjustment of resistance 71, the voltage at the bridge input terminals may be thereby determined and fixed at a potential value required for calibrating the balance bridge network 22 so that it will be effective over substantially the entire range of the balancing potentiometer, to determine at any scale loading within the maximum load range of the scale system, the extent of operation of motor 24 required to actuate (through reduction gear 25) potentiometer element 51 sufficiently to produce a zero error signal, such that the relation between the scale load weight in terms of say, pounds, and then umber of revolutions or fractional part of a revolution of the motor rotor element is in accordance with a definite desired ratio. The ratio thus determined may be for example, 10:1, so that each ten revolutions of the motor rotor element represents one pound of scale load weight. Consequently through proper selection of the gear ratio in respect to the portion of the reduction gear unit 25 connecting motor 24 to the weight indicator 26, the latter may be adapted to provide in response to motor operation thereof, weight indications in pounds.

Included in the lead 65 of supply circuit 70 to the main field 68 of motor 24 is a control switch 78 which when closed, conditions the motor 24 for operation in response to load responsive energization of its control field winding 66, while in open position, it prevents motor operation. Arranged preferably in the opposite lead 67 of circuit 70 is a cam-controlled switch 73 which as will appear more fully hereinafter, normally is in circuit-closed condition at all times other than during cyclic operation of the recorder mechanism 29. Accordingly, at this point in the description the switch 73 may be considered as being in closed condition. Thus, control switch 78 which is in the nature of a motor holding control, affords in open position motor retention of a weight reading on the dial indicator 26 while the indicated load is removed from the scale platform and another load placed thereon. The succeeding load will result in a corresponding unbalance voltage at the motor control winding 66, so that upon closure of switch 78, the motor 24 will operate forwardly or reversely depending upon the phase of the voltage at winding 66, such as to relocate the indicator pointer in a position corresponding to the weight of the new load. Such weight indication is effected quickly and in a much shorter time than would be required were the motor returned to its initial zero load position in response to removal of the load from the scale, followed by actuation to set-up the indicator weight in accordance with the succeeding load application. This feature is of particular advantage in instances where a number of nearly similar loads are to be measured.

The system of Fig. 2 as thus far described, is essentially in accordance with the subject matter as disclosed in the hereinbefore noted application Serial No. 259,148. However, in the system as now provided, the motor drive to the weight indicator 26 is utilized to set-up or condition suitable weight printing or recording mechanism for producing printed or other permanent recording of scale load weights. In addition and importantly to the present invention, weight printing or recording by the recorder mechanism is so controlled by scale balance sensing means, that printing of load weight cannot occur until the scale is in exact balance.

With reference again to Fig. 2, any suitable, well known form of recording or printer mechanism may be employed herein, as for example printer mechanism of the character shown in Hadley et al. Patent 2,070,011 to. which reference may be had for structural and operational details. For the purpose of present illustration, only such parts thereof as are necessary to an understanding of the present invention, are shown diagrammatically in broken lines in the recorder unit designated generally by the numeral 29. A plurality of stepped weight selector discs 90, 91 and 92 are fixed on a shaft 94 which is rotated coincidentally with the shaft of the dial indicator 26 as the latter is moved by the motor 24 through the reduction gearing 25. While but three selector discs 90, 91 and 92 are shown, constituting respectively the units, tens and hundreds selectors of the recorder, it is to be understood that one or more additional selector discs of higher order, as thousands, ten thousands, etc., may be employed according to the capacity of the scale.

Arranged for cooperation with the selector discs are type setting racks 95, 96 and 97 disposed respectively in alignment with the discs 90, 91 and 92 and movable into engagement with the disc steps by actuating pinions 98 on a common drive shaft 100 which is rotated by the recorder operating motor 101. Although not here shown, the pinion drive from the shaft 100 to each of the racks, is such as to permit displacements of the racks to the same or relatively different extents until each abuts a step of its selector disc. Further, the racks operate type sectors or type bars (not shown) such that in accordance with the scale setting of the selector discs, rack 95 in abutment with a step of units disc 90 locates its type bar to present a units type numeral in printing position, while rack 96 in abutment with a step of tens disc 91 locates its type bar to present a tens type numeral in printing position, and similarly with respect to rack 97 in abutment with a step of hundreds disc 92 locating its type bar to present a hundreds type numeral in printing position. In the diagrammatic example shown, a printing hammer 102 is cam-actuated from the shaft 100, as through the cam 104 effective in the cycle of printer operation at a point therein following printing positionment of the several type bars, to produce a record of the scale weight on a suitable tape, weight card or the like, interposed between the hammer and type bars.

Energization of the recorder motor 101 is from a supply circuit comprising conductors 105 and 106 which may be connected to the 110 volt, 60 cycle source 69. One terminal 108 of the motor is connected by a lead 109 to conductor 106, while the opposite motor terminal 110 is connected by leads 112 and 113 to conductor 105. Lead 113 includes normally open contacts 114 of an electro-magnetic energizing circuit control relay 116 having its relay winding 117 connected across the conductors 105—106 through a recorder start push button switch 118. For operator convenience the switch 118 need be closed only momentarily to initiate energization of the relay winding 117, as the latter then is retained in energized condition throughout the printing cycle, by a holding circuit comprising a cam-controlled recorder cycle switch 120, conductor 121 connected between relay winding 117 and switch 118 and extending to one terminal 122 of cycle switch 120, and conductor 124 connecting the other cycle switch terminal 125 to the motor lead 113 containing the contacts 114. The cycle switch cam 126 mounted on the motor operated shaft 100, has a single depression or notch 128 in its circular periphery 129 of uniform radius, provided for reception of the switch cam-follower 130 to effect open-circuiting of the cycle switch from its closed position maintained so long as the follower 130 rides the uniform radius extent of the cam periphery 129. Motor rotation of shaft 100 is counter-clockwise as appears in Fig. 2, so that the relative positions of cam 126 and switch follower 130 as shown, are those obtaining near the end of the recorder cycle as will appear more fully presently.

Turning now to an important feature of the present invention, operation of the printer mechanism to effect weight recording, is here prevented until the scale system attains exact balance. As shown in Fig. 2, included in the supply lead 112 to the printer operating motor 101 is the switch portion 132 of an electro-magetic relay switch 133. Switch 132 normally is in closed circuit position in the de-energized condition of the relay winding 134, and is held open upon and during energization of the relay winding. The relay coil 134 is supplied from a suitable source of energizing potential (not shown), by a supply circuit including a grounded conductor 136 connected to one terminal of the relay coil 134, and a conductor 137 leading to the other terminal of the coil. Included in conductor 137 is the switch portion 138 of a differential electro-magnetic relay 140 having relay windings 142 and 143, the relay being of a type wherein in the de-energized condition of both windings 142 and 143, the movable switch element 144 is normally disposed in a neutral or switch-open position between the fixed contact elements 146 and 147 having common connection with the portion 148 of conductor 137.

The operation of relay 140 is controlled by a scale balance sensing device provided by a phase-sensitive electronic circuit indicated generally at 150, which in the present example, is adapted and arranged for sensing the presence and absence of unbalance voltage in the amplifier output circuit 64 leading to the control field 66 of motor 24. In so sensing, it responds to such unbalance voltage of either positive or negative phase, by causing operation of the differential relay 140 such that its movable switch element 144 is in engagement with contact 146 or contact 147, thereby closing the supply circuit to the winding 134 of relay 133 to energize the latter and hold open the switch 132 to prevent energization of the recorder motor 101. Although here shown as connected to the amplifier output circuit 64, the device 150 may be connected in an intermediate stage of the amplifier, or to the amplifier input for response to the resultant voltage at that point.

The electronic control device 150 as illustrated in Fig. 2, comprises a pair of vacuum tubes which in the present example of the device may be three-element tubes as the triodes 151 and 152, and includes an anode voltage supply transformer 154 having primary winding 155 connected to a suitable source such as the 110 volt, 60 cycle line 156, and secondary winding 158 the center point of which is tapped and grounded at 159. Anode 160 of triode 151 is connected by lead 162 to one end terminal of transformer secondary 158, and similarly the anode 163 of triode 152 is connected by lead 164 to the opposite end terminal of the transformer secondary 158. The respective cathodes 165 and 166 of triodes 151 and 152 are connected together through series-connected capacitances 167, with the circuit connection between the capacitances grounded as at 168, and connected by lead 170 to a conductor 171 which connects the adjacent ends of the relay coils 142 and 143 in series-circuit relation. A lead 172 connects the remaining end of relay coil 142 to the cathode 165 of triode 151, while lead 174 connects the remaining end of relay coil 143 to the cathode 166 of triode 152. Extending from the control grid 175 of triode 151 is a conductor 176, and leading from grid 178 of triode 152 is a conductor 179, these conductors being connected together and to one end of an unbalance voltage input lead 180, as at 182. The lead 180 preferably including a suitable circuit coupling capacitance 183, extends to connection at 184, with one side of the amplifier output circuit 64. The opposite side of the latter circuit is grounded at 186, while bridging the circuit 64 is a suitable condenser 187. Included in the grid circuit of the electronic relay circuit is a grid resister 173 grounded as shown.

It will appear now from the foregoing description of the control 150, that the triodes 151 and 152 are in phase opposition in the circuit arrangement shown, and have their grid elements in a common input circuit coupling them to the amplifier unbalance voltage output circuit 64 so that the grid voltage of each triode results from and varies directly with the unbalance voltages in the circuit 64. Consequently, in the presence of unbalance voltage of one phase direction, the grid voltage of one triode, say triode 151, will be in phase with the anode voltage of such triode, and the grid voltage of the other triode 152 will be out of phase with the anode voltage thereof. Therefore, current conductance will take place through triode 151 with resultant energization of the relay winding 142 and consequent circuit-closure displacement of switch 144 to engagement with contact 146, while current conductance through triode 152 either will not appear or at most, will occur to a minimum or limited extent. When the unbalance voltage is of opposite phase, the reverse of the above will take place, resulting in predominant energization of relay winding 143 with resultant engagement of switch 144 with contact 147. Hence in either case, the relay will be operated by engagement of relay switch element 144 with one or the other of the contacts 146 and 147, to complete the supply circuit to relay coil 134 and thereby activate relay 133 to effect an open-circuit condition of its switch 132. Thus, so long as there is unbalance voltage of either phase direction in circuit 64, the triode sensing circuit will respond as described, to operate relay 140 and thereby the relay 133, the latter responding to open and hold open the supply circuit to the motor 101, to prevent recorder operation. When the unbalance voltage in circuit 64 becomes zero, indicative of exact scale balance either in loaded or unloaded condition, the triode sensing circuit then becomes deactivated such as to result in a neutral or open-circuit position of the relay switch element 144, with attendant de-energization of relay 133 and consequent closure of its switch 132. Whereupon, operation of the recorder mechanism may take place.

In the present scale load sensing and weight indicating system, a balanced condition of the system obtains when the voltage in circuit 64 is zero. Nevertheless, at balance there may be a small residual voltage in circuit 64, comprised mainly of quadrature and third harmonic voltage components. Such residual voltage does not adversely affect the attainment of true weight indication by the system, since the motor 24 does not respond to small voltages of this character. The more sensitive triode balance sensing circuit however, may and normally will respond to these component voltages. But because of the opposed relation of the triodes 151 and 152 in the circuit as shown and described, and due to the nature of quadrature and third harmonic component voltages, both triodes will conduct if at all, in equal degree to effect equal but opposite energization of the differential relay windings 142 and 143. As a result, the relay switch 144 will remain in its neutral or open-circuit position.

In the operation of the system including the recorder mechanism and balance sensing provision as shown by Fig. 2, the control motor 24 will be in initial position in the absence of scale-applied load, to effect through reduction gearing 25 zero-weight reading by the indicator 26 and angular disposition of the weight-selector discs 90, 91 and 92 in initial positions corresponding to zero weight. As so conditioned, unbalance voltage will be absent in circuit 64, the triode balance sensing circuit will be in balance with the relay 140 in open-circuit condition, and the relay 133 will be deenergized with its switch 132 closed to complete the recorder motor supply lead 112. Now, upon operator actuation of the push button switch 118, as by momentary closure thereof, the relay 116 thereby is energized to close its contacts 114 in motor supply lead 113, with the relay retained in energized condition through the holding circuit including the recorder cycle control switch 120. While Fig. 2 shows the cam 126 in a position of counter-clockwise rotation near the end of its rotational displacement in the cycle, its initial position as at the start of the cycle, is such that the switch follower 130 engages the cam periphery 129 in the region adjacent the cam notch 128. So long as the cam follower 130 is on the cam periphery 129, the switch 120 is thereby retained in closed condition. Consequently, at the start of the cycle wherein switch 120 is closed with its follower 130 on the cam periphery at the point 190 thereof, the motor 101 then energized from the supply circuit 105—106 through the closed relay contacts 114 and closed switch 132, operates to rotate shaft 100 in the counter-clockwise direction, and with it the cam 126, pinions 98 and the print hammer actuating cam 104. The pinions 98 displace the racks 95, 96 and 97 to engagement with steps of the discs 90, 91 and 92 and since in the present example the latter are in initial or zero weight positions, each rack will abut the zero weight step of its associated disc and thereby set its associated type sector or bar (not shown) for zero weight printing. In the revolution of the shaft 100 and following type setting by the racks and selector discs, cam 104 actuates print hammer 102 to effect printing or impressing of a tape or card against the type to record weight, as zero weight in this instance. Following the printing or recording portion of the cycle, further rotation of the cam 126 brings the cam notch 128 to a position for reception of the follower 130, the latter entering the notch and thereby opening the cycle switch 120. Immediately consequent to opening of switch 120, the relay 116 becomes de-energized with its contacts 114 opening to de-energize the print motor 101. Motor 101 then rapidly decelerates to a stopped condition, turning the cam 126 a further angular distance sufficient to elevate the follower 130 from the cam notch 128 and to the initial point 190 of the cam, the switch 120 thereby being again closed, ready for a succeeding printer cycle.

At this point it is to be noted in connection with recorder mechanism as herein diagrammatically indicated at 29, and as more completely disclosed in the aforementioned Patent 2,070,011 to Hadley et al., provision is made to continue recorder operation throughout the recording cycle once the recorder motor 101 is energized and starts operating. It is deemed sufficient in the present disclosure, to illustrate a relatively simple, yet effective arrangement exemplary of a suitable provision for this purpose which, as here shown diagrammatically in part, includes a second switch 191 which controls a holding circuit for motor 101, in bridging relation to the switch 132 as through conductors 193 and 194. Operation of switch 191 is controlled by a cam 198 on shaft 100, the cam having a raised part or nose 199 and being fixed on shaft 100 in a position relative to the position of cam 126, such that the cam nose 199 is in axial alignment with the initial or start point 190 of cam 126. Engaging the cam 198 is a follower element 203 of the switch 191. With this arrangement, when the cams 126 and 198 are in initial positions, as with the follower 203 on the nose 199 of cam 198, the switch 191 will be in open-circuit condition, opening the shunt circuit of conductors 193 and 194. Upon starting of recorder motor 101, the cam nose 199 passes from under follower 203 and the latter then rides on the surface of the cam with the contacts of switch 191 in closed condition. The closed position of the switch 191 completes the bridging circuit about switch 132, so that the motor 101 will continue operation throughout the recorder cycle and independently of the position of switch 132.

In addition to the shunt switch 191 provided to assure recorder operation through its recording cycle and independently of control switch 132 once the recorder motor 101 is energized, the present controls include the hereinbefore mentioned switch 73. The function of this switch is to open the power supply lead 67 to the main winding 68 of motor 24 and to retain the circuit open throughout each cycle of recorder operation. Thus, during each operation of the recorder mechanism to effect weight recording, motor 24 is thereby effectively precluded from operation in response to changes in scale loading or other factors producing change in the unbalance voltage condition in circuit 64, so that it cannot then attempt to alter the set positions of the selector discs 90, 91 and 92 (as well as the position of the indicator 26) while the recorder is undergoing its recording cycle. Operational timing of switch 73 to accomplish the above purpose, may be affected through cam-control thereof, as by the cam 74 fixed on recorder shaft 100 and having a raised portion or nose 75. Similarly to cam 198, the cam 74 is located so that its nose 75 is in axial alignment with the recorder cycle start point 190 of the cycle switch cam 126. In that relation and with the cams disposed at the start position of the recorder cycle (hereinbefore described), the cam-follower element 76 associated with the movable element 77 of switch 73, will be on the cam nose 75 and thereby elevated to close the contacts of the switch. Consequently, so long as the recorder mechanism is not in recording operation, the switch 73 will be and remain in circuit-closed condition. But upon recorder operation, the cam nose 75 passing beyond the follower 76, results in displacement of the switch element 77 to effect open-circuiting of the switch, with the latter again closed by the cam nose 75 at the end of the recorder cycle.

Continuing with the description of operation, upon loading of the scale, the system responds as hereinbefore described, to actuate the indicator 26 to a position indicating the weight of the scale load, and at the same time to actuate the printer selector discs 90, 91 and 92 to positions corresponding to the load weight. Now if the printer start switch 118 be operated, the relay 116 will close its contacts 114 and hold through closed switch 120, and should the switch 132 then be in closed position, the print motor 101 will operate the printing mechanism through its printing cycle to produce a record of the scale load weight. However, if the scale system is not then in balance, the triode circuit sensing unbalance voltage in the circuit 64, will operate to cause an open circuit condition at switch 132. The latter then will not close until zero unbalance voltage obtains in circuit 64, at which time the scale system will be in exact balance.

The foregoing description of operation of the system is predicated upon a closed position of the motor holding switch 78. However, when this switch is opened to hold the motor 24 in operated position with the indicator 26 at a weight reading corresponding to the weight of a given scale applied load, so long as such given load remains on the scale platform the system will remain in balance, and the print cycle may be repeated as often as desired, each time producing a record of the given weight. Now, if the given weight be removed from the scale while the motor 24 is in held condition (switch 78 open), the motor positioned indicator 26 will remain at the weight reading of the given weight, but operation of the recorder mechanism cannot take place upon closure of the printer start switch 118, because control switch 132 then will be open. The open condition of switch 132 in this instance, is the result of unbalance voltage in the circuit 64 to the removal of the given weight and consequent unbalance of the network system. Such voltage is sensed by the triode circuit 150, with the result that relay 138 is closed to energize relay 133, and the latter then holding open its switch 132. If now the switch 78 be closed, motor 24 will respond to such unbalance voltage by restoring the balance of the network system corresponding to zero loading of the scale, and coincidentally therewith returning indicator 26 to zero reading and restoring the selector discs 90, 91 and 92 to initial or zero weight positions. Whereupon the recorder mechanism may be operated to provide a record of zero weight, since in the balanced condition of the system then obtaining, the switch 132 will be closed.

Returning to the first mentioned condition, as with switch 78 open to hold the indication of the given weight referred to, upon removal of such weight and application of a different weight to the scale, the network system responds by producing unbalance voltage in circuit 64 of a value corresponding to the net weight. Again, so long as the switch 78 remains open, the voltage in circuit 64 results through the triode sensing circuit 150, in an open-circuit condition of switch 132 to prevent operation of the recorder mechanism. However, upon closure of switch 78, motor 24 will respond by operation to balance the network system, to operate the indicator 26 to a position indicative of the new weight, and to set the selector discs 90, 91 and 92 according to the new weight. Whereupon, closure of the start switch 118 will cause recorder operation if switch 132 is then closed, or condition the recorder for operation automatically upon closure of switch 132 in response to sensing of scale balance by the triode circuit 150.

In the system according to Fig. 2, the power supply at 69, at the primary of transformer 19, at primary 155 of transformer 154 and to the power input (not shown) of the amplifier 23, are provided from a single power source common to the indicated power inputs. Moreover, while the system shown preferably is intended for operation on 110, 60 cycle power supply, it may readily be adapted to a power supply suitable for the purpose and of a voltage and frequency other than as herein indicated. It will be appreciated that by energizing the several components of the system from one and the same power source, maintenance of required phase relationships in the system is assured, and the system is thereby rendered self-compensating for normally encountered variations in the supply voltage.

Since the response of the present system is quite rapid in weighing operations, under certain weighing conditions as for example, when the scale platform mechanism is subjected to vibratory movements of momentary or longer durations, or in the event the applied load should be reduced before the system comes to balance, the unbalance voltage in the circuit 64 will undergo consequent phase reversals. Such phase reversals of the unbalance voltage result not only in corresponding reversing or so-called "hunting" operations of the motor 24 in its attempts to re-balance the bridge network 22, but in movements of the differential relay switch element 144 from one to the other of the contacts 146 and 147, consequent to unbalance voltage response of the electronic relay circuit 150. Each time the relay switch 144 moves from one contact to the other, the energizing circuit 136–137 to the relay 133 is broken, with resultant closure of the recorder motor control switch 132, and operation of recorder motor 101 should the contacts 114 be then closed.

In order to prevent such momentary de-energizations of the relay 133 during reversals of contact operation of the relay 140 consequent to phase reversals of the unbalance voltage in circuit 64, the present system includes a suitable time delay device in operative connection with the relay 133 and effective for continuing energization of the latter while the differential relay switch element 144 is in movement from one fixed contact to the other under the "hunting" condition as aforesaid. A simple device for this purpose, is provided by a suitable capacitance 207 of predetermined capacity value, arranged in parallel with the relay winding 134 as across the supply conductors 136 and 137.

Figure 3:
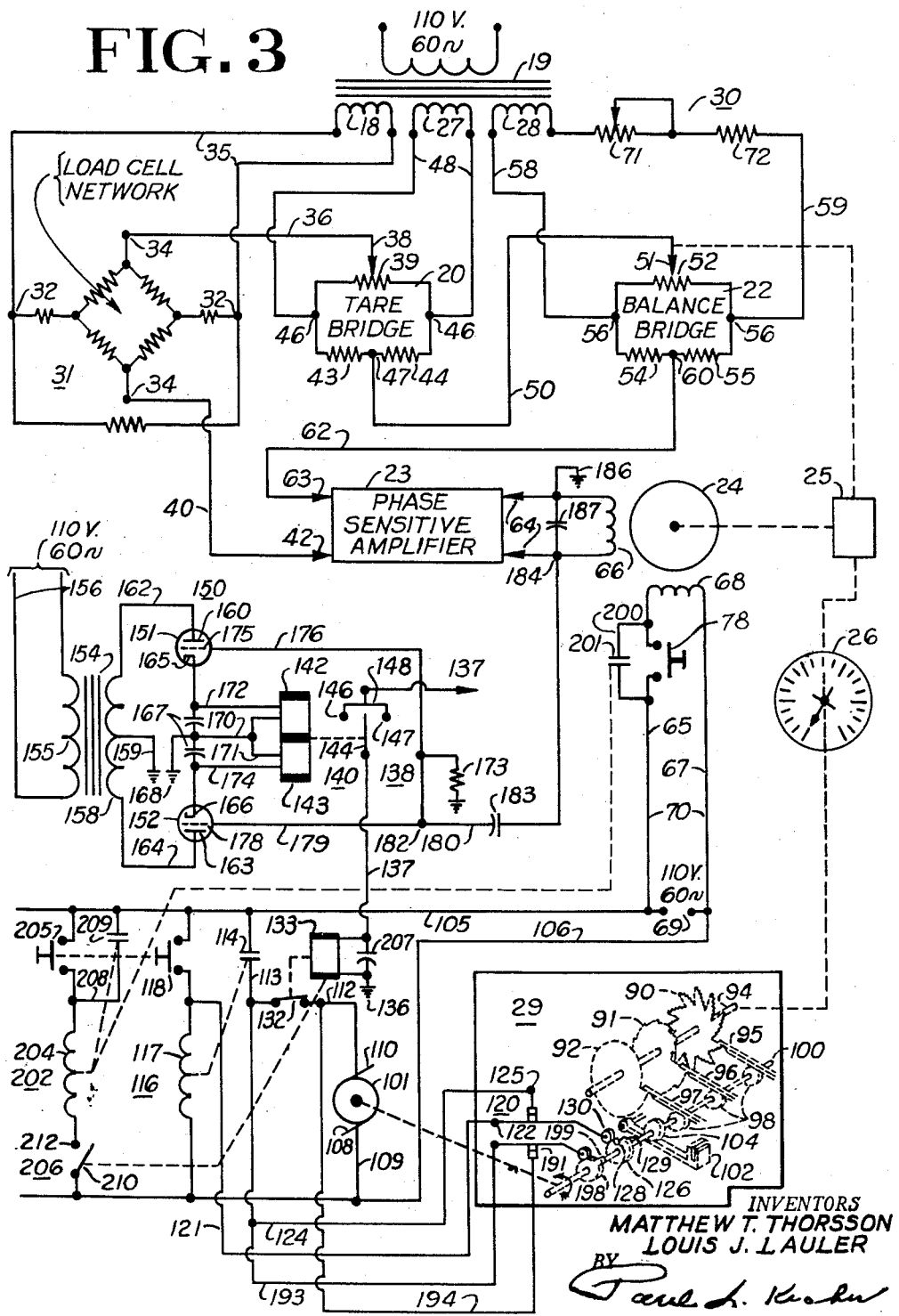
Fig. 3 is a circuit diagram like that of Fig. 2, but illustrating a modification in respect to the weight printer control provision of the circuit of Fig. 2.

Except for certain additional control provisions now to be described, the system as shown in Fig. 3 is similar to that of Fig. 2. Accordingly, the circuits and circuit elements appearing in Fig. 3 which correspond to the like circuits and elements shown in Fig. 2, are here designated by the same reference numerals. The additional control provisions now to be described, are provided to adapt the arrangement according to Fig. 2, for operational control from the operator-actuated printer push button switch means under conditions when it is desirable to leave the motor hold switch 78 in open position, as when a series or relatively large number of items of somewhat similar weights are to be weighed and it is not desired to have the system returned to zero balance before each succeeding item is applied to the scale.

Referring to Fig. 3, in bridging relation to the motor hold switch 78 (here shown as a normally open push button switch) is a contact circuit 200 having therein normally open contacts 201 of an electro-magnetic relay 202. The relay winding 204 is adapted for energization from the supply circuit 105—106 through push button switch 205 between one end of the winding and the supply conductor 105, and switch 206 between the opposite winding end and the supply conductor 106. Switch 205 is joined with switch 118 for simultaneous manual closure, it being understood that these switches are normally urged to open positions. A holding circuit 208 is provided for the relay 202, such circuit including the normally open contacts 209 which are closed upon energization of relay winding 204.

Switch 206 is operated by the relay 133, and includes movable switch element 210 normally urged to a switch-open position relative to fixed switch contact 212 when relay 133 is de-energized.

In operation of the system utilizing the additional controls and with the motor holding switch 78 retained in open position, upon application of load to the scale, the network system responds by producing in the circuit 64 an unbalance voltage as before described. Since switch 78 is open, motor 24 does not operate, but the triode balance sensing circuit 150 responds to the unbalance voltage by actuation of the relay 140 to engage switch element 144 with one or the other of the fixed contacts 146 and 147. As hereinbefore explained, closure of switch 138 produces an energized condition of the relay 133 such that it holds open its switch 132 to prevent recorder operation, and at the same time effects closure of contact 210 with contact 212. With the system so conditioned, manual closure of switch 205 (and coincidentally switch 118) then results in energization of relay winding 204 and consequent closure of relay holding contacts 209, with simultaneous closure of contacts 201 to complete the circuit 200 bridging the open hold switch 78. Closure of switch 118 operates the relay 116 to close the contacts 114, the relay remaining energized through its hold circuit including the cycle switch 120, upon release of switch 118. With switch 210 closed and upon release of switch 205, relay 202 remains energized through its hold contacts 209, to retain contacts 201 closed.

Upon closure of the bridging circuit contacts 201, motor 24 immediately responds to the unbalance voltage in circuit 64 by operation to balance the network system, and at the same time to move the indicator 26 to a position indicating the weight of the scale load, and to set the printer selector discs 90, 91 and 92 in positions corresponding to the load weight. When the system becomes balanced with zero voltage at the circuit 64, the triode balance sensing circuit 150 responds by de-energization of the relay 140, whereupon switch 138 returns to neutral or circuit-open position. The resultant de-energization of relay 133, delayed momentarily by the time-delay capacitance 207, causes open circuiting of the switch 210 which causes de-energization of relay 202 with consequent opening of the holding contacts 209 and bridge circuit contacts 201. With contacts 201 open, the motor 24 is then retained in load balanced position to hold the weight reading on indicator 26 and to retain the selector discs 90, 91 and 92 in actuated positions corresponding to the load weight. The de-energization of the relay 133 of course, effects closure of switch 132, whereupon the motor 101 operates to drive the recorder mechanism through the recording or printing cycle, as before described.

The weight of the load thus having been indicated and recorded, such load now may be replaced by the next item to be weighed. At such time and before the manual switches 205 and 118 are closed, the weight of the preceding load item will remain on the indictor 26, while the printer selector discs will be in positions corresponding to such load. Now, by momentarily closing switches 205 and 118, the system will respond by operation through the indicating and printing cycle as above described, such as to indicate the new weight on indicator 26 and effect printing of the new weight. The cycle is repeated for each succeeding load item, and it will be now appreciated that in each case, the extent of operation of motor 24 required to re-balance the network and to actuate the indicator and set the printer selector discs, is determined by the difference in weight of the item undergoing weighing and of the immediately preceding item. Thus, the added control provisions when utilized, greatly facilitate rapid weighing of a plurality of similar weight load items weighed one at a time, since in this instance the system does not return to zero weight balance between weighing operations.

Figure 4:
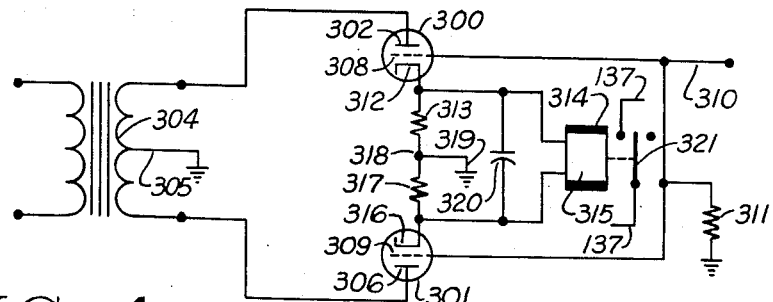
Fig. 4 is a circuit diagram illustrating a modified form of scale balance sensing device suitable for controlling weight printer operation.

Fig. 4 illustrates a modified form of triode balance sensing circuit which may be substituted for that embodied in the system according to Figs. 2 and 3. This circuit is approximately as sensitive and effective as the first described circuit, and is adapted for controlling a single coil relay switch instead of a differential relay. As in the first embodiment, a pair of triodes 300 are provided, with the anode 302 of triode 300 connected to one end of transformer secondary 304 having its center point tapped at 305 and grounded, and the anode 306 of triode 301 connected to the opposite end of transformer secondary 304. The respective grids 308 and 309 of the triodes 300 and 301 are connected together and to the unbalance voltage input coupling circuit 310 which leads to connection with the amplifier output circuit 64 (Fig. 2 for example), with the grid circuit including a grounded grid resistor 311. Cathode 312 of triode 300 is connected to a resistance 313 and to one end of winding 314 of the single coil relay switch 315, while the cathode 316 of triode 301 is connected to a like resistance 317 and to the other end of relay winding 314. Moreover, resistances 313 and 317 are connected in series with the mid-point 318 of the series connection grounded at 319, while the relay winding is bridged by a suitable capacitance 320. Thus it will appear that the cathodes 312 and 316 are connected in series by an impedance circuit provided by the resistances 313 and 317 and having a mid-point terminal 318 in ground circuit connection to the center tap 305 of the transformer secondary 304.

In operation, when the grid voltage of triode 300 (due to unbalance voltage input thereto) is in phase with the anode voltage thereof, the triode will conduct to produce a voltage drop across the resistance 313. In this instance, the grid voltage of triode 301 will be out of phase with the anode voltage, to result in little if any voltage drop across resistance 317. The result is a potential difference across relay winding 314, which energizes the relay to switch closed position of its switch element 321, the switch of course, controlling the supply line 137 to relay 133 (Fig. 2). Conversely, when the grid voltage of triode 301 is in phase with the anode voltage of such triode, the latter will conduct to produce a voltage drop across resistance 317, thus resulting in a potential difference across relay winding 314 and causing relay actuation to close its switch 321.

Figure 5:
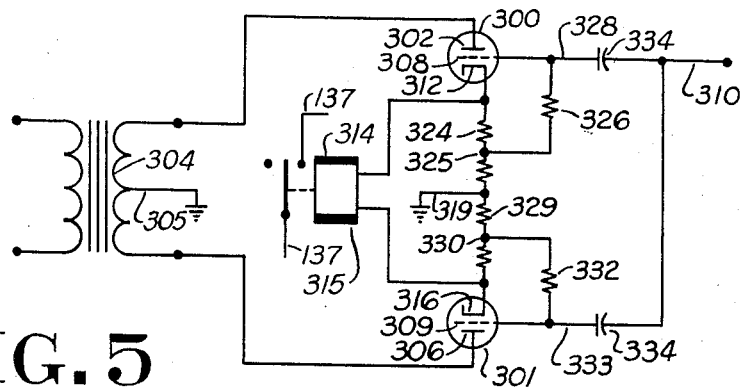
Fig. 5 is a circuit diagram of another form of scale balance sensing device.

Fig. 5 illustrates a triode balance sensing circuit like that of Fig. 4 but modified to provide for greater sensitivity of circuit response. For convenience of disclosure, the elements of this circuit corresponding to those in the circuit of Fig. 4, are here given the same reference numerals. As shown, the cathode resistance 324 connected to cathode 312 of triode 300, is tapped at 325 with the tap connected through a resistance 326 to the grid circuit 328 of triode 300. Similarly, the resistance 329 connected to cathode 316 of triode 301, is tapped at 330 with such tap connected through a resistance 332 of equal value with resistance 326, to the grid circuit 333 of triode 301. Each grid circuit includes a coupling capacitance 334.

Figure 6:
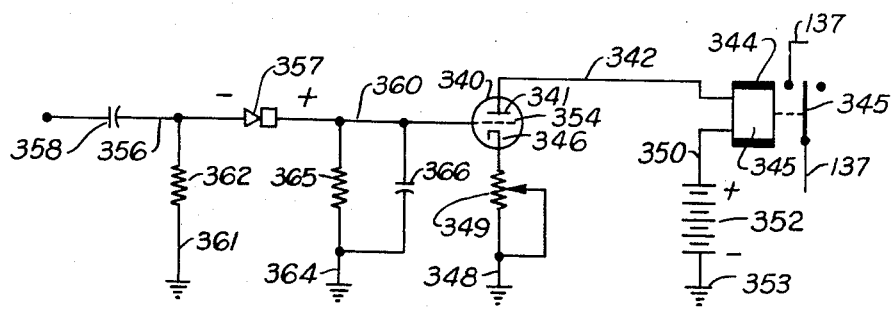
Fig. 6 is a circuit diagram of yet another form of scale balance sensing device.

Fig. 6 shows another balance sensing circuit capable of use in the systems of Figs. 2 and 3, and which employs but a single triode, as the triode 340. The anode 341 of the triode is connected by lead 342 to one end of the winding 344 of a single coil relay switch 345, while the cathode 346 is in a ground circuit 348 including an adjustable resistance 349. The remaining end of relay winding 344 is connected by a lead 350 to the positive side of a suitable source of direct current, as the battery 352 here shown by way of example only, the negative side of the source being grounded at 353 in return-circuit connection to the cathode 346 through the grounded cathode circuit 348. Unbalance voltage input to the triode grid element 354, as from the circuit 64 (Figs. 2 and 3), is effected by a coupling circuit including conductor 356 leading from circuit 64 and connected to one side of a suitable rectifier 357, a suitable coupling capacitance 358 being interposed in the conductor. The other side of the rectifier is connected by a conductor 360, to the grid 354. Completing the coupling circuit which of course includes a ground return circuit, are a resistance ground circuit 361 including resistance element 362, and a ground circuit 364 including resistance 365 and capacitance 366 in parallel relation as shown. Unbalance voltage input to the sensing circuit, is rectified by the rectifier 357 and applied to the triode grid element 354, causing current flow through the triode to energize the relay-winding 344 with resultant closure of its switch 345. When the unbalance voltage applied to the grid 354 decreases to zero at scale balance, current conductance of the triode normally reduces to a value resulting in de-energization of the relay winding 344 and open-circuiting of its switch 345.

Having now described by illustrations and description, several presently preferred embodiments of the invention, including several different balance sensing circuits suitable for embodiment therein, what we desire to claim and secure by Letters Patent is:

1. In a weighing scale system, means for sensing scale loading and producing a voltage the magnitude of which is proportional to the weight of a scale load, an electric motor having a control winding and operable in response to energization of said control winding, electrical means for translating said voltage to an unbalance voltage at said control winding for causing motor operation, said electrical means including a balancing network having a control device operable by said motor for effecting a balanced condition of the network to counterbalance the unbalance voltage at the motor control winding and thereby to de-energize said winding, said network being adapted for determining the extent of motor operation required to effect said unbalance voltage counter-balancing condition of the network, such that it is proportional to the weight of a scale load, weight recording mechanism including settable weight control means and motor means for actuation of the mechanism to effect weight recording in accordance with the setting of the control means, means actuated by said motor for setting said settable weight control means in accordance with the weight of a scale load, an energizing circuit for said motor means and including a circuit control switch, electrical means for sensing the presence and absence of unbalance voltage at said motor control winding, and means responsive to the last said means sensing zero unbalance voltage at said control winding, for causing closure of said circuit control switch to complete the energizing circuit to said motor means.

2. In a weighing scale system, an electric motor having a control winding for effecting operation of the motor only upon and during excitation of the winding, means for sensing scale loading and producing an unbalance voltage at said motor control winding, said means including a voltage counter-balancing electrical network having a network balance adjusting device actuated from said motor, said network being effective through motor operation of said device in response to unbalance voltage excitation of said motor control winding, to reduce the unbalance voltage to zero with consequent cessation of motor operation, said balancing network being adapted for determining the extent of motor operation required for actuation of said balance adjusting device to effect network reduction of the unbalance voltage to zero, such that it is in predetermined proportion to the weight of the scale load, weight recording mechanism including settable control means and motor means for operating the mechanism to effect weight recording in accordance with the setting of said control means, means operatively connecting said motor to said control means for motor actuation thereof to a setting corresponding to the weight of the scale load, an energizing circuit for said motor means, an electronic network for sensing the presence and absence of unbalance voltage at said motor control winding, and means responsive to said electronic network for rendering said energizing circuit ineffective to energize said motor means during network sensing of the presence of unbalance voltage at said motor control winding.

3. In a weighing scale system, an electric motor having a motor operation control winding, means for sensing scale loading and producing in application to said control winding, an energizing unbalance voltage for causing motor operation, said means including balance network means effective in response to operation of said motor, for reducing the unbalance voltage at said control winding to zero voltage and thereby effect cessation of motor operation with the motor actuated to an extent proportional to the weight of the scale load, weight recorder mechanism including settable control means operable by said motor to a setting corresponding to the weight of the scale load and means actuatable for effecting in accordance with the setting of the said control means, a record of the scale load weight, an operating motor for the last said means, an energizing circuit for said operating motor including a circuit control switch, an electronic circuit coupled to the first said means for sensing unbalance voltage in application to said control winding, and means responsive to said electronic circuit for retaining said control switch in open-circuit condition so long as the electronic circuit senses the presence of unbalance voltage in application to said control winding.

4. In a weighing scale system, a weight recorder having settable control means and recording means operable in accordance with the setting of the control means, motor means for operating the recording means, an electric motor in operative connection with said settable control means, said electric motor including main and control windings, an energizing circuit for the main winding including a control switch therein, means for sensing scale loading and producing an energizing unbalance voltage at said control winding, said motor responding thereto upon energization of said main winding through closure of said control switch, by operation to an extent proportional to the weight of the scale load and thereby operating said settable control means to a setting corresponding to the scale load weight, said control switch in circuit-open position preventing operation of said electric motor, normally open switch means in parallel with said control switch, operating means including an electronic circuit coupled to said scale load sensing means and responsive to unbalance voltage applied to said motor control winding, for effecting closure of said switch means and energization of said motor main winding to effect operation of said electric motor, and means for energizing said recorder motor means to cause operation thereof, said last means including a switch controlled by said operating means and movable to closed position upon response of said electronic circuit to zero unbalance voltage at said control winding.

5. In a weighing scale system, an electric motor having a main winding and a control winding and operable only upon energization of both windings, an energizing circuit for said main winding including normally open contacts therein, means for sensing scale loading and producing at said control winding an unbalance voltage, said means including an electrical network having a network balancing device operable by said motor for balancing the network to reduce the unbalance voltage at said control winding to zero voltage and thereby cause cessation of motor operation, said network being adapted for determining the extent of motor operation required to balance the network and reduce the unbalance voltage to zero value, such that it is in direct proportion to the weight of the scale load, a weight recorder having settable control means and including recording means operable in accordance with the setting of said control means, an operating connection between said motor and said settable control means for motor operation of the latter to a setting corresponding to the weight of the scale load, motor means for actuating the recording means to effect according to the setting of the control means, a record of the scale load weight, an energizing circuit for said motor means including a control switch normally urged to a circuit-closed position, electronic relay circuit means coupled to the first said means for sensing the presence and absence of unbalance voltage at said motor control winding, said relay circuit means being responsive to unbalance voltage at the motor control winding to open and retain said control switch in open-circuit position, thereby to prevent operation of said recorder motor means, and conversely, responding to zero unbalance voltage at the control winding such as to permit return of the control switch to circuit-closed position, and means controlled by said electronic relay circuit means for effecting closure of said contacts in said main winding energizing circuit upon response of the relay circuit to unbalance voltage at said motor control winding, thereby to cause operation of said electric motor, the last said means consequent to response of said relay circuit means to zero unbalance voltage at said control winding, causing return of said contacts to circuit-open position with resultant de-energization of said main winding of the electric motor.

6. In a weighing scale system, a weight recorder including settable control means, means including electric network means for sensing scale loading and producing an unbalance voltage, the network means including a motor responsive to said unbalance voltage for effecting a setting of said recorder control means corresponding to the weight of the scale load and coincidentally therewith, for affecting the network means such as to reduce the unbalance voltage to zero value, said motor having a main winding, an energizing circuit for said winding having normally open contacts therein, motor means for operating said recorder to produce a record of the scale load weight according to the setting of said recorder control means, an energizing circuit for said motor means including a normally closed switch therein, and relay means including an electronic relay circuit coupled to said network means for sensing the presence and absence of unbalance voltage therein, operable in response to sensing of unbalance voltage by said relay circuit, to effect closure of said contacts and opening of said switch, thereby to effect energization of said motor winding for motor operation and to prevent operation of said recorder motor means, said relay means operating responsively to zero unbalance voltage sensing by the electronic relay circuit thereof, to effect an opening of said contacts and to cause closure of said switch, thereby to de-energize the motor winding and cause operation of the recorder motor means for operating the recorder to produce a record of the scale load weight.

7. In a weighing scale system, means for sensing scale loading and producing a voltage the magnitude of which is proportional to the weight of a load applied to the scale, an electric motor having a control winding and operable responsively to energization of said control winding, electrical means for translating said voltage to an unbalance voltage at said motor control winding to energize it, said electrical means including balancing network means having a balance control device operable by said motor to a network balanced condition reducing the unbalance voltage at the motor control winding to a zero value, whereby to de-energize said motor control winding, said network means thereby determining the extent of motor operation such that it is in predetermined direct proportion to the weight of the scale applied load, weight recorder mechanism including settable control means and motor means for actuation of the mechanism to effect weight recording in accordance with the setting of the control means, an operating connection between said electric motor and said settable control means for motor setting of the latter in accordance with the weight of the scale load, an energizing circuit including a control switch for causing operation of said motor means to actuate said mechanism and effect recording of the scale load weight, electrical control means effective responsively to and during unbalance voltage energization of said motor control winding, for retaining said control switch in open position to render the energizing circuit ineffective to cause operation of said motor means, said control switch being movable to closed position upon operation of said electrical control means responsively to reduction of the unbalance voltage to zero value, and means conditioning said control switch for delayed movement to closed position.

8. In a weighing scale system, a motor having a control winding, means for sensing scale loading and producing an unbalance voltage in application to said control winding for causing motor operation, said means including a balanceable network having a balancing device operable by said motor to balance the network and thereby reduce said unbalance voltage to zero value, said network being adapted for determining the extent of motor operation required to balance the network and reduce the unbalance voltage to zero value, such that it is directly proportional to the weight of the scale load, a weight recorder including settable control means, an operating connection between said motor and settable control means for motor operation of the control means to a setting corresponding to the weight of the scale load, motor means for operating the recorder to produce according to the setting of said settable control means, a record of the scale load weight, an energizing circuit for said motor means, an electromagnetic switch in control of said circuit, electronic relay control means sensing the presence and absence of unbalance voltage in application to said motor control winding, and effective in response to the presence of unbalance voltage at the control winding to cause operation of the electromagnetic switch to circuit-open position for preventing operation of the recorder motor means, and means for delaying operation of the electromagnetic switch to circuit-closed position responsively to said electronic relay control means sensing the absence of unbalance voltage at the motor control winding.

9. In a weighing scale system, a motor having a control winding, means for sensing scale loading and producing an unbalance voltage in application to said control winding for causing motor operation, said means including a balanceable network having a balancing device operable by said motor to balance the network and thereby reduce said unbalance voltage to zero value, said network being adapted for determining the extent of motor operation required to balance the network and reduce the unbalance voltage to zero value, such that it is directly proportional to the weight of the scale load, a weight recorder including settable control means, an operating connection between said motor and settable control means for motor operation of the control means to a setting corresponding to the weight of the scale load, motor means for operating the recorder to produce according to the setting of said settable control means, a record of the scale load weight, an energizing circuit for said motor means, an electromagnetic switch in control of said circuit, electronic relay control means sensing the presence and absence of unbalance voltage in application to said motor control winding, and effective in response to the presence of unbalance voltage at the control winding to cause operation of the electromagnetic switch to circuit-open position for preventing operation of the recorder motor means, and means including a condenser connected in parallel with said electromagnetic switch for delaying operation of the electromagnetic switch in circuit-closed position responsively to said electronic relay control means sensing the absence of unbalance voltage at the motor control winding.

(References on following page)

References Cited in the file of this patent

UNITED STATES PATENTS

| | | |
|---|---|---|
| 1,104,268 | Messiter | July 21, 1914 |
| 1,773,570 | Bryce | Aug. 19, 1930 |
| 2,036,014 | Borger | Mar. 31, 1936 |
| 2,040,072 | Brendel | May 12, 1936 |
| 2,068,036 | Orling | Jan. 19, 1937 |
| 2,070,011 | Hadley | Feb. 9, 1937 |
| 2,083,783 | Haegele | June 15, 1937 |
| 2,101,452 | Rauch | Dec. 7, 1937 |
| 2,188,261 | Basquin | Jan. 23, 1940 |
| 2,392,023 | Cooper | Jan. 1, 1946 |
| 2,525,016 | Borell | Oct. 10, 1950 |
| 2,528,589 | Frick | Nov. 7, 1950 |
| 2,561,372 | Hillman | July 24, 1951 |
| 2,598,812 | Marco | June 3, 1952 |
| 2,599,588 | Siderman | June 10, 1952 |
| 2,610,052 | Macgeorge | Sept. 9, 1952 |
| 2,610,843 | Schellentrager | Sept. 16, 1952 |
| 2,628,149 | Blakeslee | Feb. 10, 1953 |
| 2,630,007 | Howe | Mar. 3, 1953 |
| 2,678,206 | Muldoon | May 11, 1954 |
| 2,766,981 | Lauler et al. | Oct. 16, 1956 |
| 2,812,170 | Kennedy | Nov. 5, 1957 |

FOREIGN PATENTS

| | | |
|---|---|---|
| 428,369 | Great Britain | May 7, 1935 |
| 508,051 | Great Britain | June 26, 1939 |